United States Patent [19]
Albizzati

[11] Patent Number: 4,617,285
[45] Date of Patent: Oct. 14, 1986

[54] CATALYST COMPONENTS AND CATALYSTS FOR THE POLYMERIZATION OF OLEFINS

[75] Inventor: Enrico Albizzati, Arona, Italy

[73] Assignee: Montedison S.p.A., Milan, Italy

[21] Appl. No.: 713,600

[22] Filed: Mar. 19, 1985

[30] Foreign Application Priority Data

Mar. 20, 1984 [IT] Italy ................................ 20138 A/84

[51] Int. Cl.$^4$ ............................................... C08F 4/64
[52] U.S. Cl. ..................................... 502/134; 502/103; 502/105; 502/125; 526/125; 526/142; 526/119
[58] Field of Search ................ 502/103, 105, 125, 134

[56] References Cited

U.S. PATENT DOCUMENTS 3,135,809 6/1964 Boxmajian ...................... 502/103 X
4,136,243 1/1979 Appleyard et al. ............. 502/125 X
4,298,718 11/1981 Mayr et al. ...................... 502/134 X Primary Examiner—Patrick P. Garvin

[57] ABSTRACT

Catalyst components for the polymerization of olefins and in particular of ethylene and of mixtures thereof with alpha-olefins comprising a tetravalent titanium halide supported on Ti trichloride or tribromide having a surface area greater than 50 m$^2$/g are disclosed, as are catalysts prepared from said components.

6 Claims, No Drawings

CATALYST COMPONENTS AND CATALYSTS FOR THE POLYMERIZATION OF OLEFINS

THE PRESENT INVENTION

This invention relates to catalyst components for the polymerization of olefins and in particular of ethylene or of mixtures thereof with alpha-olefins, and to the catalysts prepared therefrom.

It is known to use $TiCl_3$ (ARA or HRA) as component of Ziegler-Natta catalysts suitable for the polymerization of olefins.

Catalysts comprising a titanium compound containing Ti—Cl bonds, carried on halides of divalent metals in the activated form, in particular of magnesium and of manganese, are also known. These catalysts are endowed with a particularly high activity.

It has been now surprisingly found that it is possible to obtain catalysts endowed with a very high activity by supporting a tetravalent titanium compound containing at least a Ti—Cl bond on titanium trichloride or tribromide having particular physical properties.

The titanium trichloride or tribromide utilizable as a carrier has an actual surface area of at least 50 $m^2/g$. The average size of the crystallites is below 250 Å. In particular, the surface area of the carriers which are best suited to form highly active catalysts is greater than 100-150 $m^2/g$.

The average size of the crystallites is determined by measuring the half-height reflection's width (110) and by applying the known Sherrer equation in which the value 1.84 is attributed to constant K.

"Actual surface area" means the area that the titanium trihalide or the catalyst component comprising titanium is capable of generating after treatment the Al-triethyl under the standard conditions specified hereinafter.

The treatment with Al-triethyl is carried out at 80° C. for 2 hours with an Al/Ti ratio equal to 50 and with an Al concentration of 0.1 molar, in h-heptane.

The Ti trichloride and tribromide employable as carriers are furthermore characterized in that they do not contain appreciable amounts of Al halides.

In fact it was observed that the presence of Al halides adversely affects the activity of the final catalyst.

As an example, the catalysts prepared by using $TiCl_3.\frac{1}{3}AlCl_3$ (obtained by reduction of $TiCl_4$ with Al) or Ti trichloride prepared by reduction of $TiCl_4$ with Al-alkyl compounds do not provide the sufficiently high performances which are typical of the catalysts in which $TiCl_3$ obtained by reduction of $TiCl_4$ with hydrogen or with Ti is employed as a carrier.

The catalyst components of the present invention, combined with Al-alkyl compounds, provide catalysts endowed with a high activity in the polymerization of ethylene and of mixtures thereof with alpha-olefins.

The high activity of these catalysts is quite unexpected, since the catalysts obtained from titanium halide, which acts as a carrier and on which the tetravalent Ti compound was not supported, are endowed only with a moderate activity.

Another unexpected characteristic of the catalysts resides in their capability of forming, in admixture with catalysts comprising a titanium compound supported on magnesium halides in activated form, catalyst systems suited to produce ethylene polymers having a wide molecular weight distribution.

In the case of the ethylene polymers, the molecular weight distribution is an important factor which controls both the processability of the polymer and the quality and physical-mechanical properties of the articles manufactured therefrom: in particular, a polymer having a narrow molecular weight distribution gives rise, for example, to roughness of the extrudate surface due to the so-called "melt fracture", which makes it unsuitable for many uses such as extrusion molding, blow molding or film extrusions. To overcome this drawback and still others it is necessary to widen the molecular weight distribution. Three types of methods are generally employed for this purpose. The first one consists in mixing two polymers having different molecular weights, the second one consists in carrying out the polymerization in more steps so as to obtain different molecular weights, and the third one consists in using a specific catalytic system.

The last method, surely, is theoretically the best and most economical one, but generally the catalyst systems known so far exhibit the drawback of a low activity, i.e., low productivity expressed as grams of polymer per gram of catalyst (the component of the catalyst system containing the transition metal compound).

The catalysts forming the object of the present invention, conversely, are endowed with a high productivity in the homo(co)polymerization of ethylene, providing also polymers having a wide molecular weight distribution.

The Al-alkyl compounds suited to form the new catalysts are preferably selected from the aluminum trialkyls such as, for example, aluminum triethyl, aluminum triisobutyl, aluminum tri-n-hexyl, aluminum tri-n-octyl and the like. However, also Al-alkyl halides, such as $AlEt_2Cl$ and Al-ethyl sesquichloride can be advantageously employed.

In the case of the polymerization of ethylene and of mixtures thereof with alpha-olefins, particularly preferred are aluminum triisobutyl and aluminum tri-n-octyl, which can be selected depending on the yield/MWD balance to be obtained (bearing in mind that the latter provides wider molecular weight distributions than the former, but lower yields).

Aluminum trialkyl is generally added, into the polymerization autoclave, dissolved in the hydrocarbon solvent—preferably aliphatic such as n-hexane, n-heptane, isobutane and the like, in the case of the polymerization in suspension—at concentrations ranging from 0.1 to 5 g/l, depending on the specific aluminum trialkyl used.

The Al-Ti ratio in the catalytic system is higher than 1 and generally from 30 to 1,000, preferably from 50 to 500.

The tetravalent Ti compounds containing at least a halogen-Ti bond are preferably selected from $TiCl_4$, $TiBr_4$, Ti halogen alcoholates such as $TiCl_3OR$, $TiCl_2(OR)_2$, $TiBr_3OR$, in which R is a n-alkyl or isoalkyl or aryl with 1-12 carbon atoms.

The amount of tetravalent Ti compound supported on Ti trihalide generally ranges from 0.1 to 10% by weight expressed as Ti metal.

The Ti trihalide suitable as a carrier is preparable according to various methods.

One of said methods consists in decomposing a $TiCl_3.nROH$ adduct (wherein $1 \leq n \leq 4$ and R is an alkyl with 1-10C) with an excess of $TiCl_4$: there is obtained $TiCl_3$ in activated form on which a certain amount of $TiCl_4$ remains fixed.

Another method consists in cogrinding $TiCl_3$ and $MgCl_2$ until activation of the $MgCl_2$ is achieved, and then in treating in hot conditions with an excess of $TiCl_4$ and in successively separating the $TiCl_4$ excess. The $MgCl_2$ activation conditions are well known in the literature. The terms "$MgCl_2$ in activated form" as is used herein means the halide in which the size of the crystallites is below 300 Å, in particular below 200 Å.

As a practical measure of the molecular weight distribution which, the ratio between the melt indexes MIF/MIE was used, wherein MIF and MIE are the melt indexes measured at 190° C. with a weight of 21.6 and 2.16 kg, respectively (ASTM-D 1238). By comparing polymers with similar MIE, it results that a polymer having the highest melt index ratio has a wider molecular weight distribution.

The polymerization of ethylene and of mixtures thereof with alpha-olefins $CH_2=CHR$, in which R is an alkyl with 1-10C or an aryl, using the catalysts of the present invention, is accomplished according to known methods. Polymerization can be carried out in a gas phase or in a liquid phase in the presence of an inert hydrocarbon solvent, at temperatures ranging from 40° to 150° C., at atmospheric pressure or at a higher pressure.

In particular, ethylene is copolymerized with alpha-olefins $C_4$-$C_8$, such as butene-1, octene-1, in order to obtain crystallite copolymers having a density below 0.94 g/cc; the molar content of alpha-olefins in the copolymer generally ranges from 0.5 to 10%.

The following examples are given to illustrate the invention in greater detail and are not intended to be limiting of the scope thereof.

The term "$TiCl_3.HR$" is the commercial name for $TiCl_3$ alpha obtained by reduction of $TiCl_4$ with hydrogen, HR meaning hydrogen-reduced. The term $TiCl_3.HRA$ is the commercial name for $TiCl_3$ delta when obtained by dry grinding $TiCl_3.HR$, the HRA meaning hydrogen-reduced and activated. $TiCl_3.ARA$ is the commercial name for $TiCl_3$ delta when obtained by reduction of $TiCl_4$ with Al or Al-alkyls and subsequent activation by dry grinding, ARA meaning Al-reduced and activated. "$TiCl_3$ Solvay" as used in Table I, page 10, is to be understood to refer to a $TiCl_3$ catalyst component containing $AlCl_3$ and obtained by repeating Example 1 of U.S. Pat. No. 4,210,738, assigned to Solvay.

EXAMPLE 1

15 g of $TiCl_3.HRA$ and 150 ml of anhydrous ethanol were introduced into a 250 ml reactor. It was carried by means of a magnetic stirrer at 20° C. until complete dissolution of the solid, whereupon the ethanol in excess was evaporated (at 20° C.) until isolation of a solid corresponding to the following composition: $TiCl_3.3C_2H_5OH$. 10 g of this product and 100 ml of $TiCl_4$ were charged into a porous plate, the mass was gradually heated to 130° C. and it was allowed to react for 2 hours. $TiCl_4$ was removed by filtration, and an equal amount was added again repeating the treatment.

After 2 hours it was filtered and washed with n-heptane at 90° C. until disappearance of the chlorine ions in the filtrate. The solid, isolated and vacuum dried, exhibited a titanium content of 34.2%.

EXAMPLE 2

6.61 g (69.5 moles) of anhydrous $MgCl_2$ and 150 ml of anhydrous ethanol were introduced, under magnetic stirring, in a nitrogen atmosphere, into a 250 ml vessel. After 30 minutes, once the solid was dissolved, 21.5 g (140 mmoles) of $TiCl_3HR$ were added.

The temperature was maintained at 20° C. while stirring until complete dissolution of the solid. Ethanol was evaporated under vacuum until obtaining the following composition of the solid: $MgCl_2.2TiCl_3.4C_2H_5OH$. 15 g of the resulting solid were suspended in 250 ml of $TiCl_4$; after a 2-hour reaction at 130° C., $TiCl_4$ was removed by filtration and an equal amount thereof was added. After a further 2 hours, the solid was isolated by filtration and washing with n-heptane until disappearance of the chlorine ions in the filtrate.

The isolated and vacuum-dried solid exhibited on analysis a titanium content of 19.5%.

EXAMPLE 3

Into the jar of a vibrating mill having a total volume of 1 liter and containing 3 kg of steel balls with a diameter of 16 mm there were introduced, in a nitrogen atmosphere, 24 g of anhydrous $MgCl_2$ (252.6 mmoles) and 24 g of $TiCl_3HR$ (155.8 mmoles). Grinding was carried on during 60 hours.

8 g of the ground product were suspended in 100 ml of $TiCl_4$; after a 2-hour reaction at 130° C., $TiCl_4$ was removed by filtration and an equal amount thereof was added. After a further 2 hours, the solid was isolated by filtration and washing with n-heptane until disappearance of chlorine ions in the filtrate.

On analysis, the isolated and vacuum-dried solid revealed a Ti content of 9.75%.

EXAMPLE 4

Into the jar described in Example 2 there were introduced 10.1 g of $MgCl_2$, 10.1 g of $TiCl_3$ HR and 0.89 ml of $TiCl_4$; it was ground for 60 hours.

EXAMPLE 5

Example 4 was repeated, using 10.32 g of $MgCl_2$, 25.19 g of $TiCl_3$ HR and 1.66 ml of $TiCl_4$; it was ground for 60 hours.

COMPARATIVE EXAMPLE 1

Example 4 was repeated, but without using $TiCl_4$.

COMPARATIVE EXAMPLE 2

Example 4 was repeated, but without using $TiCl_3$ HR.

COMPARATIVE EXAMPLE 3

Example 3 was repeated but using, instead of $TiCl_3$ HR, an equimolecular amount of $TiCl_3$ ARA. The isolated and dried solid exhibited a titanium content of 8.6%.

ETHYLENE POLYMERIZATION

A proper amount of solid catalyst component prepared according to the examples was introduced, along with 1,000 ml of anhydrous n-heptane, containing 5 mmoles of aluminum alkyl, in a nitrogen atmosphere, into a stainless steel 2-liter autoclave, equipped with an anchor stirrer and heated to 70° C. 7 atm. of hydrogen and 8 atm. of ethylene were added, the total pressure being maintained constant for the entire duration of the polymerization by continuously feeding ethylene. After a 3-hour reaction, polymerization was stopped, and the polymer was filtered and dried.

The amount of solid catalyst component, the type of aluminum alkyl, the polymer yield and the properties thereof are recorded in the following tables.

TABLE I

| SOLID CATALYST COMPONENT | | | | | |
|---|---|---|---|---|---|
| Description | S.A. ($m^2/g$) | (mg) | Polymer (g) | Yield (g PE/g cat.) | $\eta$ inh (dl/g) |
| Example 1 | 185 | 20 | 210 | 10,500 | 3.2 |
| TiCl$_3$ HRA | <5 | 99 | 198 | 2,000 | 3.3 |
| TiCl$_3$ ARA | 40 | 87 | 330 | 3,800 | 2.9 |
| TiCl$_3$ Solvay | 95 | 67 | 275 | 4,100 | 3.6 |

In these polymerization tests, Al(i-C$_4$H$_9$)$_3$ was employed as aluminum alkyl.

TABLE II

| Catalyst component prepared according to Example No. | AlR$_3$ | Polymer (g) | Yield (Kg PE/g cat.) | MIE | MIN | MIF | N/E | F/E |
|---|---|---|---|---|---|---|---|---|
| 2 (mg 43) | TIBAL | 410 | 9.5 | 0.1 | 1.81 | 9.4 | 18. | 94. |
| 3 (mg 20) | TIBAL | 390 | 19.5 | 0.26 | 4.1 | 20.5 | 15.7 | 78.8 |
| 3 (mg 33) | TNOAL | 310 | 9.4 | 0.07 | 1.1 | 7.1 | 15.7 | 101.4 |
| 4 (mg 26.5) | TIBAL | 385 | 14.5 | 0.51 | 7.9 | 39.3 | 15.5 | 77. |
| 5 (mg 47) | TIBAL | 460 | 9.8 | 0.60 | 8.8 | 44. | 14.6 | 73. |
| 1 comp. (mg 77) | TIBAL | 350 | 4.5 | 0.21 | 1.9 | 10.5 | 9.0 | 50. |
| 2 comp. (mg 23) | TIBAL | 420 | 18.2 | 0.58 | 7.5 | 29.6 | 12.9 | 51. |
| 2 comp. (mg 31) | TNOAL | 360 | 11.6 | 0.31 | 4.2 | 19.5 | 13.5 | 63. |
| 3 comp. (mg 37) | TIBAL | 295 | 7.9 | 0.34 | 4.1 | 19. | 12.0 | 55.8 |

TIBAL = triisobutyl aluminum
TNOAL = tri-n.octyl aluminum

What is claimed is:

1. A catalyst component for the polymerization of olefins comprising a tetravalent Ti compound containing at least a halogen-Ti bond, supported on a Ti trichloride or Ti tribromide having an actual surface area of at least 50 $m^2/g$, said Ti trichloride or Ti tribromide being obtained by reduction of TiCl$_4$ or TiBr$_4$ with a reducing agent other than Al or Al organic compounds.

2. A catalyst component according to claim 1, further comprising a Ti compound containing at least a halogen-Ti bond supported on a Mg dihalide the crystallites of which have a size below 300 Å.

3. A catalyst for the polymerization of olefins prepared by mixing an Al alkyl compound with a catalyst component according to claim 1.

4. A catalyst for the polymerization of olefins prepared by mixing an Al alkyl compound with a catalyst component according to claim 2.

5. A catalyst component according to claim 1, comprising TiCl$_4$ supported on TiCl$_3$.

6. A catalyst component for the polymerization of olefins according to claim 1, comprising TiCl$_4$ supported on TiBr$_3$.

* * * * *